April 2, 1957  R. E. SCHWARTZ  2,787,572
METHOD OF MAKING A RESIN-TREATED ELASTOMER MAT
Filed Oct. 24, 1952  2 Sheets-Sheet 1
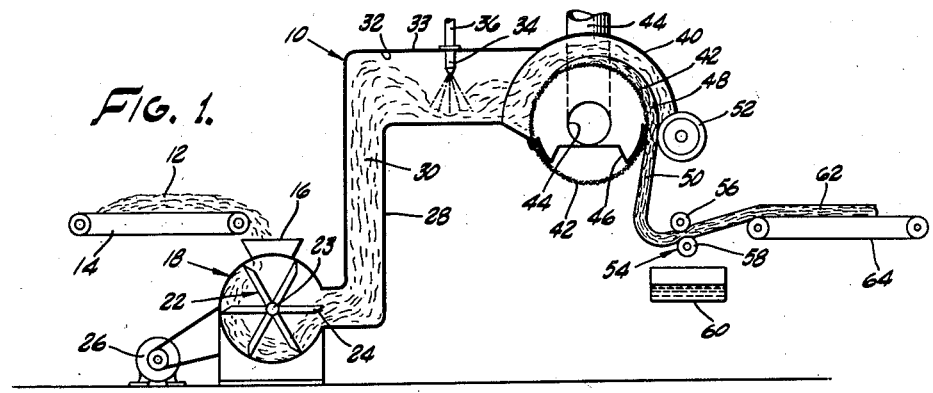
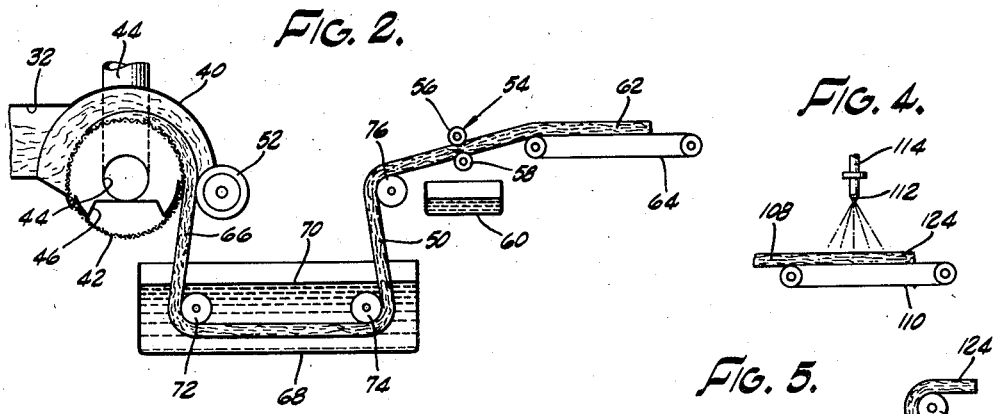
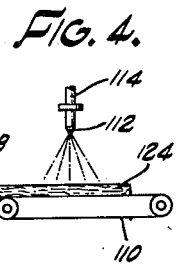
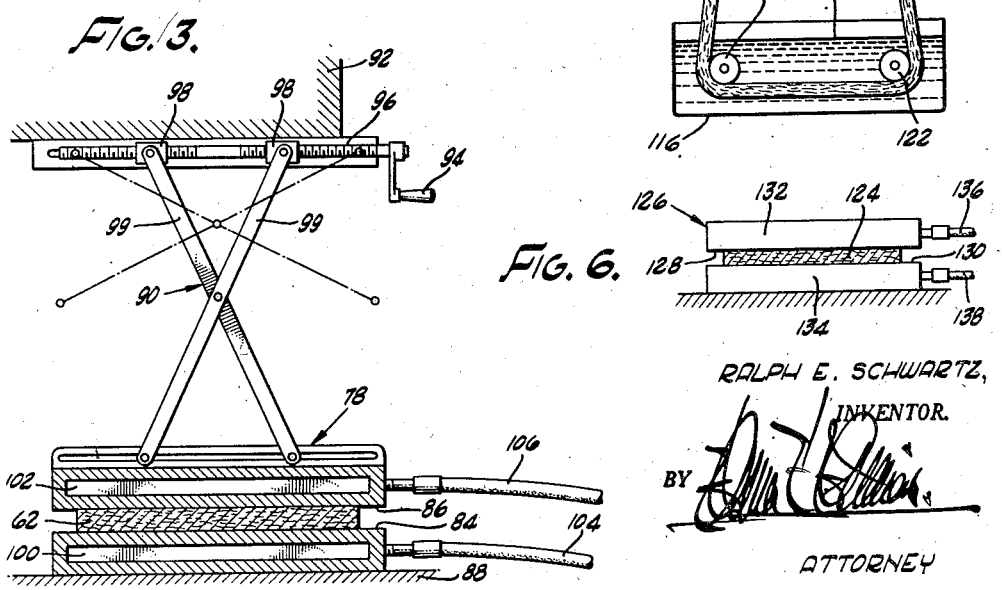
RALPH E. SCHWARTZ,
INVENTOR.
BY
ATTORNEY April 2, 1957 — R. E. SCHWARTZ — 2,787,572
METHOD OF MAKING A RESIN-TREATED ELASTOMER MAT
Filed Oct. 24, 1952 — 2 Sheets-Sheet 2
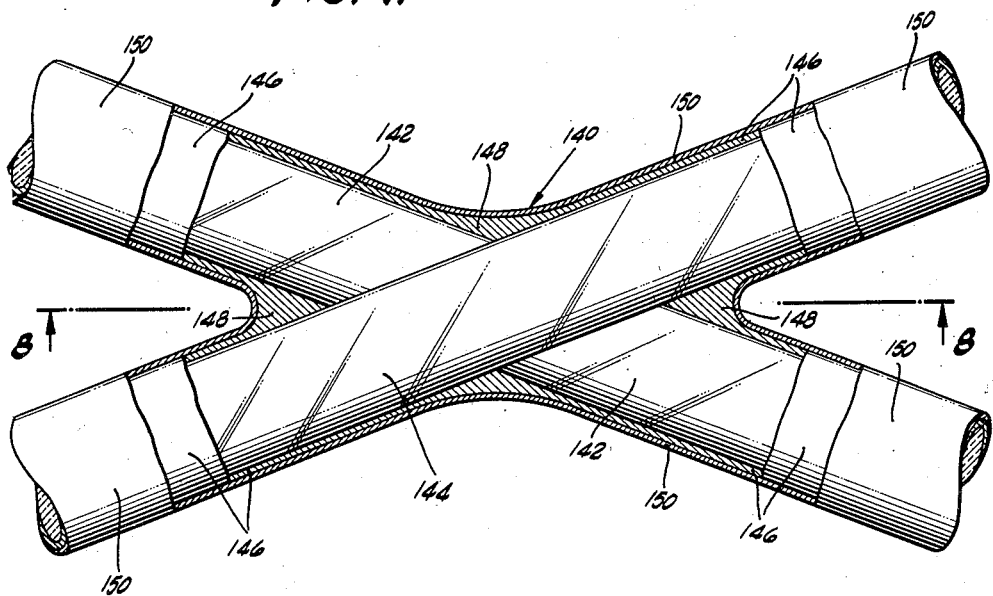
FIG. 7.
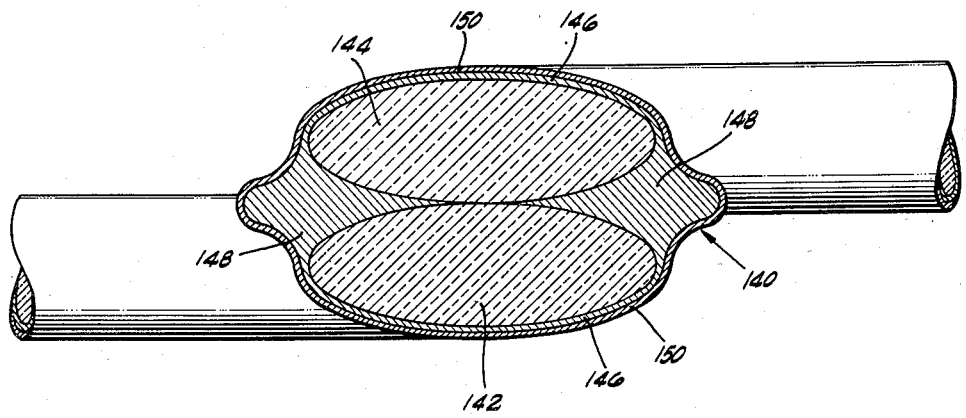
FIG. 8.
RALPH E. SCHWARTZ,
INVENTOR.
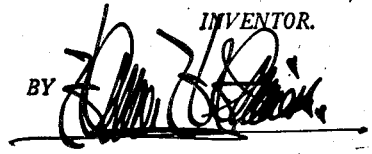
ATTORNEY

United States Patent Office 2,787,572
Patented Apr. 2, 1957

2,787,572

METHOD OF MAKING A RESIN-TREATED ELASTOMER MAT

Ralph E. Schwartz, Sunland, Calif., assignor to The Malloran Corporation, Los Angeles, Calif., a corporation of California Application October 24, 1952, Serial No. 316,652

5 Claims. (Cl. 154—101)

My present invention relates to methods of making fibrous mats, and more particularly to a novel method of making a mat which not only produces a fibrous mat having exceptional vibration damping characteristics, but which greatly facilitates the handling, storing and shipping of the mats.

Most prior art fibrous mats which were used for vibration damping and for other similar purposes were composed of fibers that were bound together by a thermosetting plastic binder material which was either partially or totally polymerized. In order for these prior art mats to have desirable fatigue characteristics it was necessary to utilize glass fibers of a particular grade and size, to use the correct type of binder material, to carefully control the degree of polymerization of the binder material and to accurately control the physical conditions present during the mat forming process.

These prior art fibrous mats, when completed, were generally too rigid to be rolled so that they had to be shipped and stored in long, flat sheets. This made the prior fibrous mats difficult to handle and relatively expensive to store and ship.

A further problem in connection with prior art fibrous mats was that it was not feasible to shape the mats at their ultimate destination. This is because the total or partial polymerization of the resin which bound the prior art fibrous mats together rendered the mats too rigid to be further shaped once the initial manufacturing process was completed.

Another problem in connection with prior art methods of producing fibrous mats was that the "K" or spring factor and the "R" or damping factor of prior art mats could not be individually established to produce mats having vibration damping characteristics particularly suited to the use for which the mats were intended.

In view of the above and other difficulties encountered in prior art methods of producing fibrous mats, it is an object of my invention to provide a method of making a fibrous mat which permits the fibrous mats to be rolled in order to greatly facilitate shipping, storage and other handling of the mats.

Another object of my invention is to provide a method of producing a fibrous mat which permits the mat to be shaped to any desired configuration at its ultimate destination rather than in the initial mat-forming process.

Another object of my invention is to provide a method of making fibrous mats which permits a portion of the mat-producing process to be accomplished at one geographical location and the remainder of the mat-producing process to be accomplished at another geographical location.

Another object of my invention is to provide a method of making a fibrous mat which permits the mat to be shipped, stored or otherwise handled without any danger of permanently deforming or otherwise injuring the mat.

Another object of my invention is to provide a method of making a fibrous mat which has unusually desirable fatigue characteristics.

A further object of my invention is to provide a method of making a fibrous mat which permits the "K" or spring factor and the "R" or damping factor of the mat to be individually determined so that the mat can be produced with vibration damping characteristics which are particularly suited to the end use of the mat.

Other objects and advantages of my invention will be apparent from the following description and claims, the novelty consisting in the features of construction, combination of parts, the unique relations of the members, the relative proportioning, disposition and operation thereof, and the novel method steps, all as is more completely outlined herein and as is particularly pointed out in the appended claims.

In the accompanying drawings, which form a part of this present application,

Figure 1 is a vertical section of my preferred apparatus for producing my mat which is impregnated with elastomer solution, Figure 2 is a partial vertical section of alternative apparatus for producing my mat which is impregnated with elastomer solution, Figure 3 is a side elevation, partly in section, showing my apparatus for curing the elastomer in my mat which is impregnated with elastomer solution.

Figure 4 is a partial side elevation showing my preferred apparatus for impregnating my elastomer mat with resin solution.

Figure 5 is a partial vertical section showing alternative apparatus for impregnating my elastomer mat with resin solution, Figure 6 is a side elevation of my apparatus for curing my elastomer mat which has been impregnated with resin solution, Figure 7 is a greatly enlarged elevation view, with portions broken away, of an intersection of two of the fibers in my completed mat, and Figure 8 is a sectional view along the line 8—8 in Figure 7.

Referring to Figure 1 of the drawings, my preferred mat-forming apparatus 10 is provided with a plurality of fibers 12 by means of a conveyor unit 14 which deposits the fibers 12 in the mouth 16 of a chopper or picker unit 18.

Although fibers 12 are preferably glass fibers for many end uses of my mat, fibers 12 may consist of any type of fiber which may be particularly suited to any use of the completed mat. For example, cotton, wool, cellulose fibers, coconut shell fibers, asbestos fibers and metal fibers may be used.

Chopper, or picker unit 18 consists primarily of a housing 20 which is cylindrical in shape, and a rotor 22 rotatably mounted within housing 20. Rotor 22 includes a shaft 23 upon which a plurality of helically arranged teeth 24 are integrally attached. Rotor 22 is rotated by a suitable motor 26 which is mechanically connected to shaft 23.

After the fibers 12 have been chopped or picked by chopper or picker unit 18 until they are substantially uniformly distributed and until they have the desired lengths, they are conducted out of the chopper or picker unit 18 through chopper output conduit 28, which conveys the chopped or picked fibers 30 upward into a dispersing chamber 32.

Dispersing chamber 32 has a substantially greater cross-sectional area than chopper output conduit 28 in order to cause a wider dispersion of the chopped or picked fibers 30 within dispersing chamber 32.

Disposed in the upper wall 33 of dispersing chamber 32 is a spray nozzle 34. Spray nozzle 34 is provided with fluid to be sprayed on picked or chopped fibers 30 within dispersing chamber 32 by means of a fluid conduit 36, which is suitably connected to a reservoir or other fluid container (not shown).

The solution which I spray onto chopped or picked fibers 30 in dispersing chamber 32 through spray nozzle 34 is preferably a combination of a wetting agent and an elastomer which are dissolved in an appropriate solvent. However, if it is desired, the wetting agent alone may be applied to the fibers at this stage of my process and a solution of elastomer may be applied to the fibrous mat after it has been formed either by passing it through a tank containing the elastomer solution in the manner illustrated in Figure 2, or by spraying the elastomer solution on the mat.

The wetting agent which is applied to the fibers in dispersing chamber 32 causes the elastomer solution to flow freely along the individual fibers 30 in order to relatively evenly distribute the elastomer over the fibers' surfaces. Wetting agents normally consist of more or less complicated chemical molecules composed of two conventional parts, one termed hydrophylic and the other termed hydrophobic. Any wetting agent will accomplish the desired result of causing my elastomer to flow along the individual fibers more freely. Examples of a few of the commonly known wetting agents which are suitable for use in my process are di octyl sodium sulfo-succinate, di hexyl sodium sulfo-succinate, di amyl sodium sulfo-succinate, di iso butyl sodium sulfo-succinate, and iso propyl naphthalene sodium sulfonate. A highly desirable wetting agent is aersol O. T., which is the common designation of iso propyl naphthalene sodium sulfonate, which has the advantages of being readily mixable with an elastomer in a single solution and of operating well in the presence of acid. Aersol O. T. also has the advantage of not adversely affecting some of the resins which may be utilized in a later step of my process.

Any elastomer may be applied in solution to the fibers in dispersing chamber 32. All thermo-plastics are suitable elastomers for use in my process. Examples of these thermo-plastic elastomers are polystyrenes vinylidene chloride-acrylo-nitrile, the copolymer of vinyl chloride, vinylidene chloride and the synthetic latices, some of which are styrene butadiene compositions. Examples of some of the elastomers other than thermo-plastics which are suitable for use in my process are the natural latexes, which are secretions obtained principally from rubber trees and are suspensions of hydrocarbons in an aqueous serum containing also small quantities of proteins, resinous materials, mineral salts and sugars.

The sprayed fibers 38 which have thus had both elastomer and wetting agent applied thereto are passed into a semi-cylindrical forming hood 40 within which the sprayed fibers 38 are deposited on a cylindrical forming screen 42 which is coaxial with semi-cylindrical forming hood 40.

Suction is applied to the interior of cylindrical forming screen 42 by means of an exhaust tube 44 which opens into the central region inside of forming screen 42. A suitable exhaust pump (not shown) is operatively connected to the exhaust tube 44 to cause air to be withdrawn through exhaust tube 44 at the desired rate.

A blanking member 46 is disposed within cylindrical forming screen 42 in such a manner that the portion of cylindrical forming screen 42 which is outside of forming hood 40 is blanked off from operative association with exhaust tube 44 so that all of the air which is removed through exhaust tube 44 will be supplied from within forming hood 40. The suction applied at the interior of cylindrical forming screen 42 causes a continuous stream of air to flow into chopper or picker unit 18 through mouth 16, up through output conduit 28, laterally through dispersing chamber 32 into forming hood 40, thence through cylindrical forming screen 42 out exhaust tube 44. This continuous flow of air causes the fibers to continuously and uniformly flow through the system with the air until the fibers are stopped by cylindrical forming screen 42, upon which the fibers are deposited.

Cylindrical forming screen 42 is in continuous rotation clockwise in Figure 1 so that when the sprayed fibers 38 have piled up to the desired thickness, as at 48 in Figure 1, they will have been moved to the extreme right-hand portion of forming hood 40 in Figure 1. At this point the formed mat 50 which is impregnated with wetting agent and elastomer in solution is removed from forming hood 40 and cylindrical forming screen 42 by means of a compressor and extractor roller 52 which is rotated counter-clockwise in Figure 1 by any conventional means. Roller 52 is spaced from cylindrical forming screen 42 a distance which approximates the desired thickness of elastomer-impregnated mat 50.

The thickness and density of the elastomer-impregnated mat 50 are determined by the nature of the fibers 12, the amount of chopping or picking applied to the fibers by chopper or picker unit 18, by the amount of solution applied to the fibers in dispersing chamber 32, by the speed of rotation of cylindrical forming screen 42, by the amount of suction applied to the interior of forming screen 42 through exhaust tube 44 and by the spacing of compressor and extractor roller 52 from cylindrical forming screen 42.

Elastomer-impregnated mat 50 is passed through a wringer 54 which consists of a pair of spaced wringer rollers 56 and 58 which are spaced apart a distance which is substantially less than the thickness of elastomer-impregnated mat 50. A surplus fluid collector 60 is disposed directly beneath wringer 54 to collect any of the elastomer solution which is wrung out of mat 50.

One purpose accomplished by this wringing operation is to cause a redistribution of the solution with which mat 50 is impregnated so that there will be a relatively even distribution of elastomer in my completed mat.

Adjustment of the spacing of wringer rollers 56 and 58 permits me to control the amount of fluid which is wrung out of elastomer-impregnated mat 50. Since the "R" or damping factor of my completed mat is dependent upon the amount of elastomer which is present in the completed mat, I am able to control the "R" or damping factor of my completed mat by merely controlling the amount of elastomer solution which is wrung out of mat 50 in this step of my process.

Another important result of my wringing operation is that it greatly enhances the fatigue characteristics of my completed mat by breaking many adjacent fibers which would otherwise break during the operation of my completed mat. By compressing my mat between wringer rollers 56 and 58 while the mat is wet, a much larger number of the abrading fibers will be broken than if my mat were similarly compressed when it was dry. By thus breaking a large number of the abrading fibers at this stage of my process most of the fibers which would otherwise break during the operation of my completed mat are already broken when the mat is put into operation, so that practically no fatigue will occur in my completed mat when it is being used as a vibration dampener.

My wrung or squeezed mat 62 is removed from wringer 54 by means of a conveyor unit 64 and is now ready for the next step in my process during which I cure the elastomer in mat 62.

Figure 2 of the drawings illustrates alternative apparatus for impregnating my mat with elastomer solution. The fibers are not sprayed with elastomer solution before being formed into the mat, and the mat 66 without elastomer solution impregnated therein which is formed in the manner described in connection with Figure 1 is impregnated with elastomer solution by being passed through a bathing tank 68 which contains a bath of elastomer solution 70. A pair of spaced guide rollers 72 and 74 are disposed within bathing tank 68 to conduct mat 66 through the bath 70 of elastomer solution.

The wetting agent may either be applied to the fibers as a part of bath 70 in bathing tank 68, or it may be sprayed on the individual fibers within dispersing chamber 32 before the fibers are formed into the mat 66.

Elastomer-impregnated mat 50 is guided upward out of bathing tank 68 over an additional guide roller 76 and is then wrung out by wringer 54 in the manner described in connection with Figure 1 to produce the wrung or squeezed mat 62. The mats 62 produced by the apparatus of Figure 1 and Figure 2 are substantially identical.

The next step in my process is to set the elastomer in mat 62. This setting operation may be carried out in any conventional manner, such as by heat treating mat 62 or by dielectrically treating mat 62.

If the elastomer is to be cured by heat treatment, a convenient apparatus for heat-treating mat 62 is the heating press 78 illustrated in Figure 3 of the drawings. Heating press 78 not only sets the elastomer in mat 62, but also compresses mat 62 to the desired density and provides mat 62 with flat surfaces which are smooth and uniform.

Mat 62 is disposed between the parallel flat surfaces 80 and 82 of lower and upper heating plates 84 and 86, respectively. Lower heating plate 84 is integrally attached to a supporting member 88, and upper heating plate 86 is movably mounted on lazy tongs 90 which are affixed to an upper supporting member 92. The vertical position of upper heating plate 86 is adjustable by movement of a crank 94 integrally attached to a threaded shaft 96 having opposed threading on its separate halves. A pair of internally threaded shoes 98 are threadedly mounted on the respective opposed threadings of shaft 96 and are pivotally connected to the upper ends of the respective tong arms 99 of lazy tongs 90.

Lower and upper heating plates 84 and 86 are heated by means of respective steam chambers 100 and 102 which are provided with steam through conduits 104 and 106, respectively. It is to be understood that any other conventional heating mechanism may be substituted for the above described steam heating apparatus.

I apply a sufficient heat to mat 62 for a sufficient amount of time to drive off enough of the moisture from the elastomer to satisfactorily set the elastomer in mat 62. An example of a satisfactory heating cycle for setting a styrene compound elastomer is heating mat 62 at two hundred (200°) degrees Fahrenheit for six (6) minutes. A normal heating cycle for setting my elastomer in mat 62 will be insufficient to volatilize and hence drive off the wetting agent. Thus, the wetting agent will be present when I apply my resin solution to my mat in the hereinafter described manner. However, if the heating cycle for setting the elastomer is sufficiently great to drive off the wetting agent, it may be desirable to add further wetting agent at the time the resin is applied to the mat.

My elastomer mat 108 which comprises my mat 62 after the elastomer has been set in the above manner, is a strong, flexible mat which will not appreciably deteriorate by the passage of time or by exposure. The flexible nature of mat 108 permits it to be rolled up into large rolls or to be otherwise packaged for purposes of storage and shipping. My resin may be applied to elastomer mat 108 after the storing, shipping or other handling operations have been completed.

The method of manufacturing and distributing my mat in which my elastomer mats 108 are produced and then are stored, shipped or otherwise handled, and then the resin is applied at a later time, considerably reduces the storing and shipping costs and makes handling much easier.

This method of manufacturing and distributing my mats in which the resin is applied to the elastomer mat as a later, independent operation, has the advantage of permitting the one who applies the resin to the mat to apply any ultimate shape which he desired to the mat. This can be accomplished by merely depressing parts of the elastomer mat or otherwise disfiguring the flexible mat from its original, flat shape and then curing the resin while the mat is thus altered in shape. The finished mat will then retain the shape which it had during the resin curing operation.

Regardless of whether the resin is applied to elastomer mat 108 directly after mat 108 has been produced or as a later, independent operation, the next step in producing my completed mat is to apply a solution containing a resin to my elastomer mat 108. Although any thermo-setting plastic is suitable for use in the present step of my process, examples of some of the more common resins are phenols, urea formaldehydes, polyesters polyethylenes, vinyls, silicones and combinations of these and other thermo-setting plastics.

Referring to Figure 4 of the drawings, I place my elastomer mat 108 on a conveyor unit 110 which moves mat 108 at a substantially constant speed underneath a spray nozzle 112 which is provided with a solution of my resin through a conduit 114 from a suitable source of supply (not shown).

An alternative method of applying the resin solution to my elastomer mat 108 is illustrated in Figure 5 of the drawings, this method consisting of passing elastomer mat 108 through a bathing tank 116 which contains a bath 118 of the resin solution. Elastomer mat 108 may be conducted through bath 118 in any suitable manner, such as by being passed under a pair of rollers 120 and 122 within tank 116 and then over an external roller 123 which directs the mat upward out of bath 118.

Regardless of whether the resin solution is applied to mat 108 by spraying in the manner shown in Figure 4 or by bathing in the manner shown in Figure 5, the wet mat 124 will be thoroughly impregnated with resin solution. If it is desired to increase the uniformity of the distribution of the resin solution in mat 124, mat 124 may be passed through a wringer similar to wringer 54 illustrated in Figures 1 and 2. Since the amount of resin in the finished mat determines the "K" or spring factor of the finished mat, the "K" or spring factor of the mat may be determined by wringing mat 124 until it has the desired amount of resin solution present therein.

The next step in my process is to cure the resin in mat 124 in any conventional manner, such as by heat treating mat 124 or by dielectrically treating mat 124. The resin in mat 124 may be either partially or totally polymerized during this curing step of my process without producing finished mats which differ materially in their shock-absorbing characteristics. This is because of the presence of elastomer in my mat, as will be hereinafter more fully described in connection with the Figures 7 and 8 of the drawings.

A typical resin which I use in my mat is phenol-formaldehyde. This may be suitably cured by heating the mat at a temperature of three hundred (300° F.) degrees Fahrenheit for a period of six (6) minutes. This amount of heating will cause the resin to be polymerized to approximately seventy-five (75%) percent of total polymerization.

A suitable apparatus for curing the resin in my mat 124 by heat treatment is illustrated in Figure 6 of the drawings. The mat 124 is placed in heating press 126 between the normally flat surfaces 128 and 130 of the respective upper and lower plates 132 and 134 thereof. Plates 132 and 134 may be heated to the desired temperature by electricity, steam or the like which is provided to the respective plates 132 and 134 by conduits 136 and 138.

Although the surfaces 128 and 130 of upper and lower plates 132 and 134, respectively of heating press 126 are illustrated as being flat surfaces, if it is desired to impress a shape which is other than the flat surface upon the sides of mat 124, surfaces 128 and 130 may be correspondingly shaped.

Similarly, if the entire mat 124, or any section thereof is to be molded into any shape which is other than flat, the upper and lower plates 132 and 134 of press 126 may be shaped accordingly, and when the resin in mat 124 is cured, this shape will be retained by the mat, or by any segment of the mat to which this shape is applied.

The heat which I apply to mat 124 to cure the resin does not volatilize or otherwise injure the elastomer which was previously applied to the mat, but actually serves to somewhat temper the elastomer so that the vibration damping characteristics of the completed mat are improved.

However, the heat required to cure the resin in my mat is sufficient to volatilize, and therefore drive off the wetting agent from the mat, so that the completed mat consists essentially only of fibers, set elastomer and cured resin. Thus, no wetting agent or other foreign materials are present in my completed mat to in any way interfere with either the "K" or spring factor of the mat, or the "R" or damping factor of the mat.

Figures 7 and 8 of the drawings illustrate a fiber intersection 140 between two adjacent fibers 142 and 144 within my completed mat. Since my elastomer solution was disposed on fibers 142 and 144 before my resin solution, the elastomer solution is distributed along fibers 142 and 144 directly in contact with fibers 142 and 144. The action of my wetting agent and the increased fluidity of my elastomer solution during the first portion of the heat or dielectric treatment contribute to cause my elastomer to be spread relatively uniformly along the lengths of fibers 142 and 144 as at 146 and to cause relatively large concentrations 148 of elastomer to accumulate at the fiber intersection 140. A large percentage of the total amount of elastomer deposited on the fibers in my mat will thus be concentrated at the fiber intersections 140 in the manner shown in Figures 7 and 8.

The setting of my elastomer before my resin is applied to my mat causes my elastomer to provide a relatively stable medium on which my resin solution becomes spread. My elastomer concentrations 148 at the fiber intersections 140 prevent the resin from concentrating at the fiber intersections 140. The generally smooth, rounded contours provided by my set elastomer cause my resin to be substantially evenly distributed over the elastomer as at 150 in Figures 7 and 8.

The amount of polymerization of the resin does not materially alter the distribution of the resin on the fibers, and does not cause the resin to form in concentrations at the fiber intersections 140, because there is no tendency for the resin to concentrate in any particular place along smooth surfaces, and the elastomer concentrations 148 at fiber intersections 140 provide smooth surfaces for the resin.

Only a very small percentage of the fibers in my completed mat will break due to abrasion between adjacent fibers. This is because of the relatively large concentrations of elastomer at the fiber intersections 140 which permit a large amount of flexing between adjacent fibers 142 and 144 with practically no abrasion between fibers 142 and 144, and also because of the relatively large quantities of elastomer and resin which cover the fiber lengths as at 146 and 150, respectively, in Figures 7 and 8 of the drawings, which prevent the fiber lengths from abrading against one another when the mat is compacted during operation.

My completed mat has unusually good vibration dampening characteristics, not only because of the lack of fiber breakages therein during operation, but also because of the controllable "R" or damping factor of my mat and "K" or spring factor of my mat, which are adjustable by control over the types and amounts of elastomer and resin, respectively, used in my mat.

The relatively smooth contours at fiber intersections 140 which are presented to the resin when it is applied to my fibers permit me to apply a relatively large quantity of resin to my fibers without having concentrations of resin appear in the mat. This is essential in creating a relatively high "K" or spring factor for certain types of fibers such as cotton, wool or cellulose fibers which normally do not have a sufficient "K" or spring factor to produce a mat which is satisfactory for vibration dampening.

The excellent fatigue, spring and damping characteristics of my mat are, in general, independent of the quality of the fibers used, the physical conditions present during the production of my mat, and also the amount of polymerization of the resin used. Thus, many of the critical factors in prior art processes for manufacturing vibration dampening mats have been eliminated by my novel process.

By first producing my elastomer mat 108, and then impregnating it with resin and curing the resin, I have greatly reduced the difficulties involved in storing, shipping and otherwise handling fibrous mats. In addition to reducing storing and shipping space required for my mats by providing an intermediate mat such as elastomer mat 108 which can be rolled into a readily manageable package, I have provided a highly desirable method by which a manufacturer of particular fibrous devices can purchase large sheets of fibrous material (elastomer mats 108) and can then form articles of any desired shape by merely adding a resin solution to the original mat material and then shaping the mat material and curing the resin therein. This is much more convenient for manufacturers of particular articles than the entire production of the fibrous mats from the raw materials up through the completion of the mats.

The above mentioned uses and advantages of the elastomer mat 108 make it a highly useful and saleable item independent of the completed mat.

It is to be understood that the form of my invention herein shown and described is my preferred embodiment and that various changes in the shape, size, arrangement of parts and operative steps may be resorted to without departing from the spirit of my invention, or the scope of the appended claims.

I claim:

1. The method of making a mat which includes the steps of applying elastomer to a plurality of fibers, forming said fibers into a mat, concentrating a substantial portion of said elastomer at points of intersection between adjacent fibers in said mat and setting said elastomer as thus concentrated, then applying resin to said fibers and then curing said resin.

2. The method of making a mat which includes the steps of applying elastomer to a plurality of fibers, forming said fibers into a mat, controlling the amount of elastomer present in said mat to control the damping factor of the completed mat, concentrating a substantial portion of said elastomer at points of intersection between adjacent fibers in said mat and setting said elastomer as thus concentrated, then applying resin to said fibers and then curing said resin.

3. The method of making a mat which includes the steps of applying elastomer to a plurality of fibers, forming said fibers into a mat, concentrating a substantial portion of said elastomer at points of intersection between adjacent fibers in said mat and setting said elastomer as thus concentrated, then applying resin to said mat, controlling the amount of resin present in said mat to control the spring factor of the completed mat and curing said resin.

4. The method of making a mat which includes the steps of applying elastomer to a plurality of fibers, forming said fibers into a mat, controlling the amount of elastomer present in said mat to control the damping factor of the completed mat, concentrating a substantial portion of said elastomer at points of intersection between adjacent fibers in said mat and setting said elastomer as thus concentrated, then applying resin to said fibers, controlling the amount of resin present in said mat to control the spring factor of the completed mat and curing said resin.

5. The method of making a mat which includes the steps of applying elastomer to a plurality of fibers, forming said fibers into a mat, setting said elastomer, then applying resin to said fibers, shaping said mat and then curing said resin.

References Cited in the file of this patent
UNITED STATES PATENTS

| | | |
|---|---|---|
| 2,339,562 | Eustis | Jan. 18, 1944 |
| 2,372,433 | Koon | Mar. 27, 1945 |
| 2,600,843 | Bush | June 17, 1952 |